Jan. 26, 1965  R. C. YOUNG ETAL  3,167,349
CONVERTIBLE VEHICLE TOP CONSTRUCTION

Filed Dec. 6, 1961  3 Sheets-Sheet 1

INVENTORS
RICHARD T. BINGMAN &
RALPH C. YOUNG
BY
Richard D. Howser
ATTORNEY

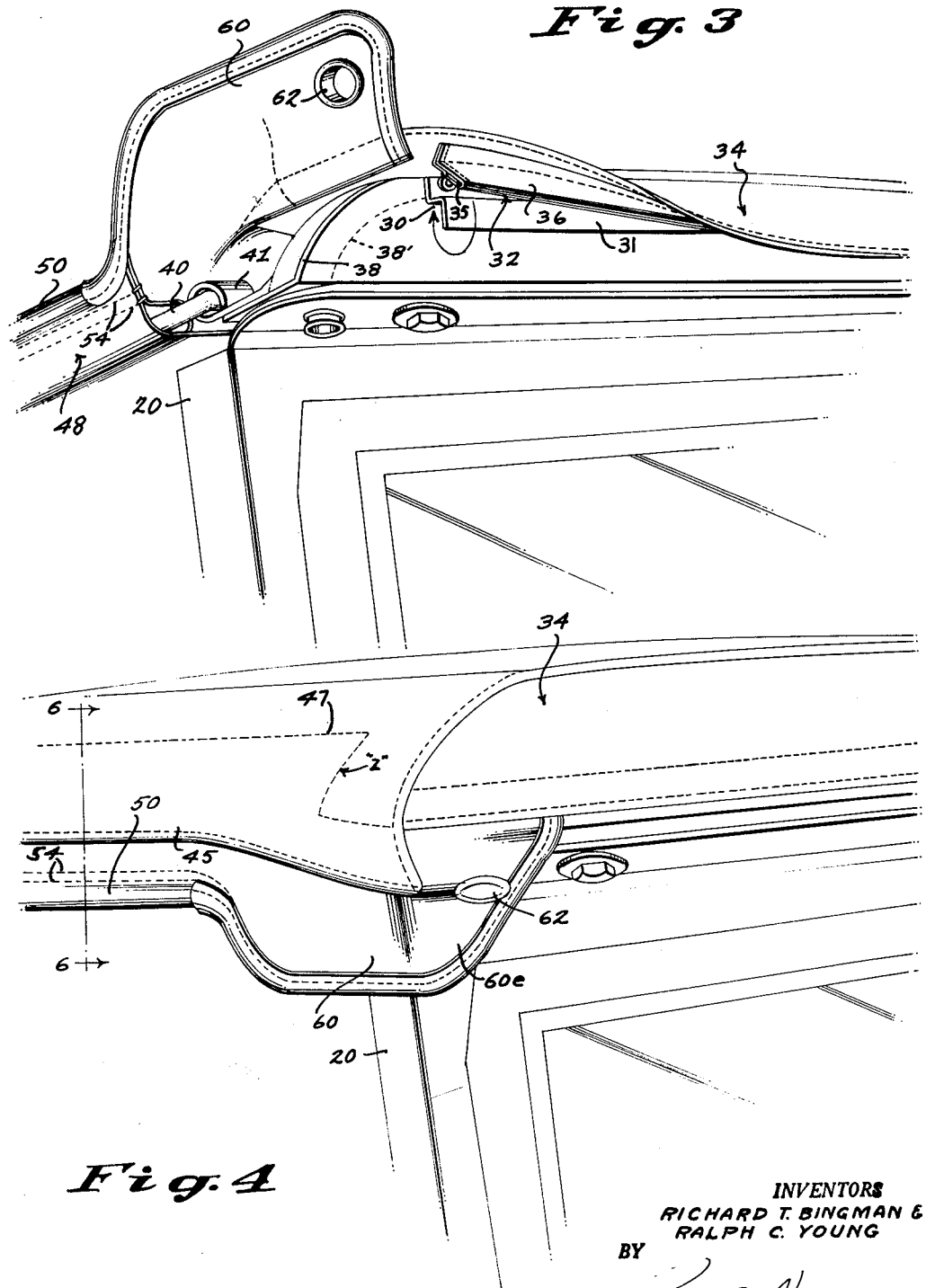

INVENTOR.
RICHARD T. BINGMAN &
BY RALPH C. YOUNG

ATTORNEY

United States Patent Office 3,167,349
Patented Jan. 26, 1965

3,167,349
CONVERTIBLE VEHICLE TOP CONSTRUCTION
Ralph C. Young and Richard T. Bingman, Colorado Springs, Colo., assignors, by mesne assignments, to White Automotive Corporation
Filed Dec. 6, 1961, Ser. No. 157,356
9 Claims. (Cl. 296—137)

The present invention relates generally to convertible vehicle tops and more specifically to a type of construction affording a substantially weather-tight seal between the front, sides, and corners of the top and other stationary or movable parts of the vehicle, while at the same time providing a method and means for quickly converting the top into its collapsed aspect.

The so-called "convertible" top for vehicles has long been used and recognized as an expedient means for transforming an enclosed vehicle passenger area into one which is entirely open on the top and one which contributes to the accessibility of the vehicle interior. Traditionally, convertible tops have been constructed of fabric or other foldable material which can be stretched into a covering over the passenger compartment of a vehicle and attached to a rearward station of the vehicle and to a forward support thereon, such as the top of the front windshield frame. In addition to the top covering, side and back curtains have been provided, their extent and design depending upon the vehicle on which they are used. Whatever the precise arrangement of the top design, it is customary in nearly all cases to provide a detachable union between the edges of the fabric top and the body of the vehicle, at least at those points at which the top must be disconnected from the body in order to collapse the top. Here again, those precise points depend largely on the specific design in question, however, it is uniformly true that such a union must be provided between the forward edge of the fabric top and the windshield frame to which the top is secured. Several arrangements have been devised for the purpose, however, two basic classifications may be made, the first being the more expensive and cumbersome type wherein the fabric top is permanently secured to a metal framework which is in turn clamped and sealed to the windshield frame of the vehicle. The second type is characterized by the detachment which must be made between the vehicle and the fabric of the top itself each time the top is removed from its covering position over the vehicle interior.

The second method is more commonly associated with military or sports type vehicles, such as the "Jeep," manufactured by the Willys Motor Company, because of its obvious advantages over other methods and devices with respect to its adaptability to different vehicles, cheapness of construction, and allowance for manually folding the top into a compact volume when removed from the vehicle.

It is in this latter area that the top construction of the present invention finds its greatest usefullness; however, it is readily adaptable to all classes of vehicles.

It will be apparent to those who have worked with the fabric tops of the prior art on military or sport vehicles such as the "Jeep," or the International Harvester Company's "Scout," vehicle that certain disadvantages and shortcomings are present therein, not the least of which is the difficulty encountered and time consumed in mating the snap fasteners which have heretofore been employed with fabric tops to attach them to a vehicle, especially when the top is wet and tends to shrink. Another serious defect is the air leakage which occurs between the snap fasteners along the forward edge of the top and at the top corners of the windshield frame where the side and front panels of the top are joined.

It is, therefore, a principal object of the present invention to provide a novel means for securing a fabric top to a vehicle.

More specifically, the object of the invention is to provide a weather-tight detachable union between the leading edge of a fabric top and the windshield frame of the vehicle to which it is applied.

A second specific object is to provide a union which can be easily and quickly made and disconnected while at the same time providing a continuous or lineal seal with the windshield frame.

A further object of the invention is to combine the forward edge attachment means with one adapted to unify the leading edge and the side edge in such a manner as to render the juncture between the top and the corner post free from air leaks and weather-tight.

In scanning the prior art with respect to convertible tops for vehicles of the type to which attention has been directed, it is apparent that a third major inadequacy present in the construction thereof is the failure of these tops to give adequate weather-proof joints around the doors, whether the doors be of fabric or of the more conventional metal construction.

Thus, it is a further object of the present invention to provide an improved seal between a vehicle door and a fabric top.

A still further objective of the invention is to provide a combined door sealing means and a fabric water deflector above the top edge of the door to further insure the adequacy of the door seal.

Other and still further objects, features, and advantages of the invention will become apparent to those skilled in the art upon a reading of the following detailed description of a preferred embodiment of the invention which is directed specifically toward a convertible top adapted and designed for the "Scout" utility vehicle, manufactured by the International Harvester Company.

In the drawings:
FIGURE 1 is a general perspective view of a vehicle having a convertible top incorporating the improvements of the present invention.

FIGURE 3 is a further enlarged perspective detail view of the convertible top front corner construction with certain portions being shown lifted for sake of clarity.

FIGURE 4 is a further enlarged perspective detail view of the convertible top corner construction as it would appear with the door open.

Figure 1:
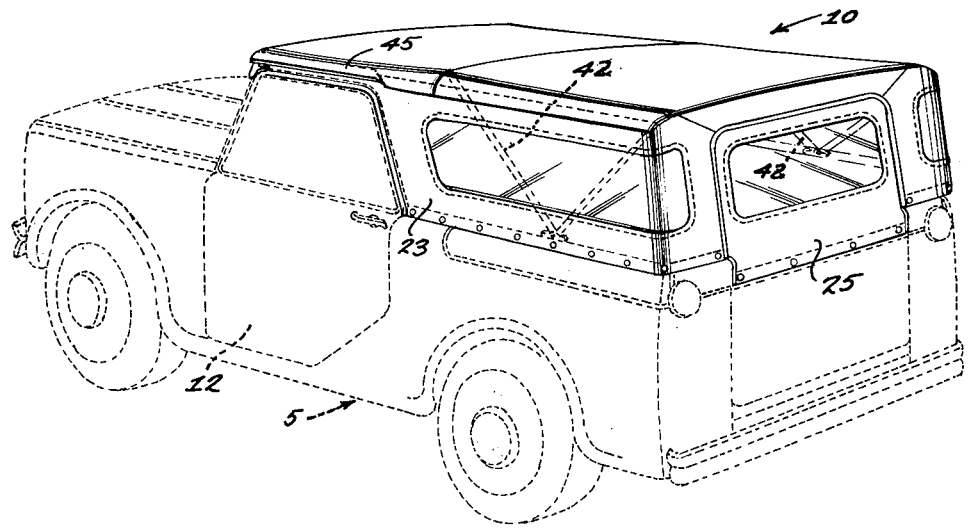

Referring now to the drawings, a convertible vehicle top according to the present invention is indicated generally at 10 in FIGURE 1 and is illustrated and will be described as applied to the "Scout" vehicle 5, above referred to. This vehicle is one having doors 12 of conventional construction including a raisable window 14 and a window frame 16x, which forms the upper portion of the door.

It is to be understood at the outset that the invention is described in connection with the aforesaid vehicle for illustrative purposes only and is not to be taken as limited thereto. The features of the present invention have varied application and the scope of protection is limited only by the appended claims.

As seen in FIGURE 1 the top 10 extends over the passenger and cargo area of the vehicle and is attached at its forward end to the winshield frame 20. Snap fasteners or similar means are provided at the lower rear extremities of the depending side curtains 23 and the rear curtain 25 to fasten the top to the vehicle body.

In carrying out the invention, a channel 30 is formed along the front face of the windshield frame into which is inlaid a welt 32 attached by sewing or other convenient means, to the underside of the forward edge 34 of the top 10. The welt 32 comprises a metal retainer strip 35 inwrapped in a fold of pliant material 36 which may be the same fabric out of which the top is constructed. The channel 30 is defined by the surface of an upwardly extending facing plate 38, and the outwardly and downwardly extending side of an elongated Z-shaped member 31 which is secured by any suitable means to the facing plate 38 of the windshield frame and extends the length thereof. The width of the channel 30 is such that the inwrapped retainer strip 35 fits snugly therein. In the illustrated embodiment, the facing plate 38 and its tubular reinforcing rib 38' are added as a part of the inventive combination to the vehicle structure in order to provide strengthened facing surface with which the channel 30 may be formed; however, on some types of vehicles the design of the windshield frame is such that a channel can be fashioned with the face of the windshield frame itself and without the use of the facing plate extension, all of which will subsequently be described.

Figures 8, 9:
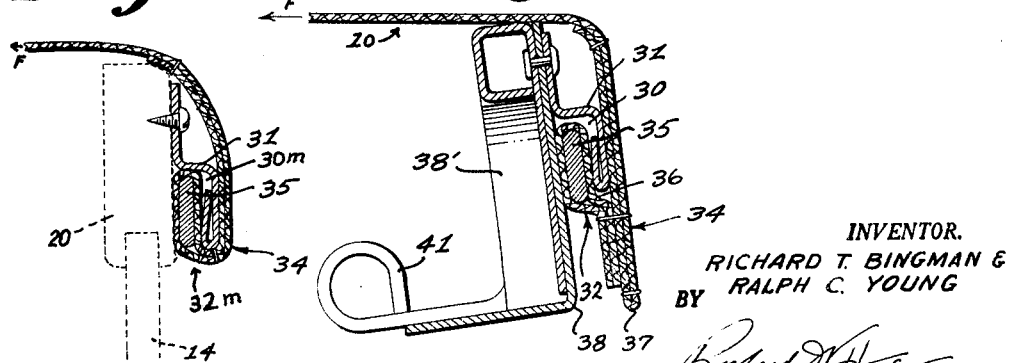
FIGURE 8 is a cross-sectional view of the leading edge attachment means taken along lines 8—8 in FIGURE 5.
FIGURE 9 is a cross-sectional view taken similarly to FIGURE 8 and showing a modification of the forward edge attachment means.

Referring now to FIGURES 8 and 9, the preferred construction of the forward edge attachment and a modification thereof are respectively illustrated in cross section. A depending forward flap 34 is formed by the hemmed leading edge of the top 10. Hemming the edge produces the obvious advantages of giving body to and stiffening the flap and provides a smooth closed edge 37 at the lower extremity of the flap. When adapted for use with the upwardly extending facing plate 38, the flap 34 is made to extend below the downwardly exposed channel opening to cover the entire front surface of the facing plate 38, thereby presenting a finished appearance to the front edge of the top and exhibiting a protective shield against driven moisture which might otherwise tend to enter the vehicle through the joint between the facing plate 38 and the windshield frame 20. Because the hemmed flap 34 is so employed, an additional extremity in the form of the aforementioned welt 32 is affixed to the underside of the flap 34, thus providing a novel means for detachably securing the flap to the vehicle. It will be appreciated, however, that greater simplicity can be achieved while following the teaching of this invention by inserting the retainer strip 35 in the hem of the flap 34 and eliminate entirely the separate welt 32. This expedient becomes feasible in applications where the Z-shaped channel forming member 31 may be attached directly to the face of the upper portion of the windshield frame, as may be done for example on the Willys Motor Company's Universal "Jeep" vehicle. This modified construction is depicted in FIGURE 9 where the retainer strip 35 is held within the hem of flap 34, forming a simplified welt 32m which is inlaid in the channel 30m.

With either embodiment when mounting the top on the vehicle, the elongated welt 32 is first pressed firmly into the channel 30 along its entire length; the top is then stretched back over the vehicle interior and secured at its rearward margin to the body of the vehicle, thus creating a constant rearwardly directed force F in the top fabric and thereby maintaining the welt in the channel. As illustrated in FIGURES 3 and 8, a continuous lineal air-tight seal is achieved by the inlaid welt and the depending flap 34. When it is desired to remove the top it is only necessary to remove the rearward restraining force force holding the welt in the channel and to extract the retainer strip therefrom.

As a further feature of the present invention there are, cooperating with the forward sealing attachment, means providing a weather protective seal between the top and each vehicle side door and in particular around the topmost corners of the windshield frame. Since both sides and both corners are identical, only one side and corner construction will be disclosed in detail.

A horizontally disposed side supporting rod 40 is seen in FIGURE 3 inserted at its forward end in the closed loop of a bracket 41 carried by the facing plate 38. The rearward end of the supporting rod 40 is detachably held by an inclined U-shaped center bow 42 which extends laterally across and beneath the top and acts as a support therefor. In a substantially vertical position just aft of the side door window frame 16x is a second rigid rod 40a, which is held at its upper terminus by the horizontal rod 40, and which is combined with the beaded edge of the side panel 23 in the same manner as the the horizontal rod 40 is combined with its contiguous beaded edge 50, as will be more fully explained. The lower end of the vertical rod 40a is inserted into a socket formed in the vehicle body. The combination of metal rods 40 and 40a works to give rigidity and support to the fabric edges of the top which abut with the closed side door of the vehicle.

Since the subject matter of the invention primarily involves the fastening of the fabric top it will suffice to those skilled in the art to mention that the supporting rods 40, 42, and 40a are all detachably interconnected in order that the rods may be manually disconnected from one another and removed from their hemmed enclosures within the fabric of the top. Such arrangements are old in the art and may include apertures in a larger rod into which a smaller rod is inserted or may be in the form of sockets or eyes welded onto one rod for the insertion therein of another.

Attention is directed now to that portion of the vehicle top immediately above the side door where it is seen that the hemmed side edge of the top constitutes a flap 45 having a downwardly depending curvelinear surface extending over the supporting rod 40 and traversing substantially the length of the vehicle side door. The primary purpose of the flap 45 is to provide a rain rail or awning which acts to divert moisture outwardly of the cleft between the door and an inner sealing sikrt 48.

Figure 2:
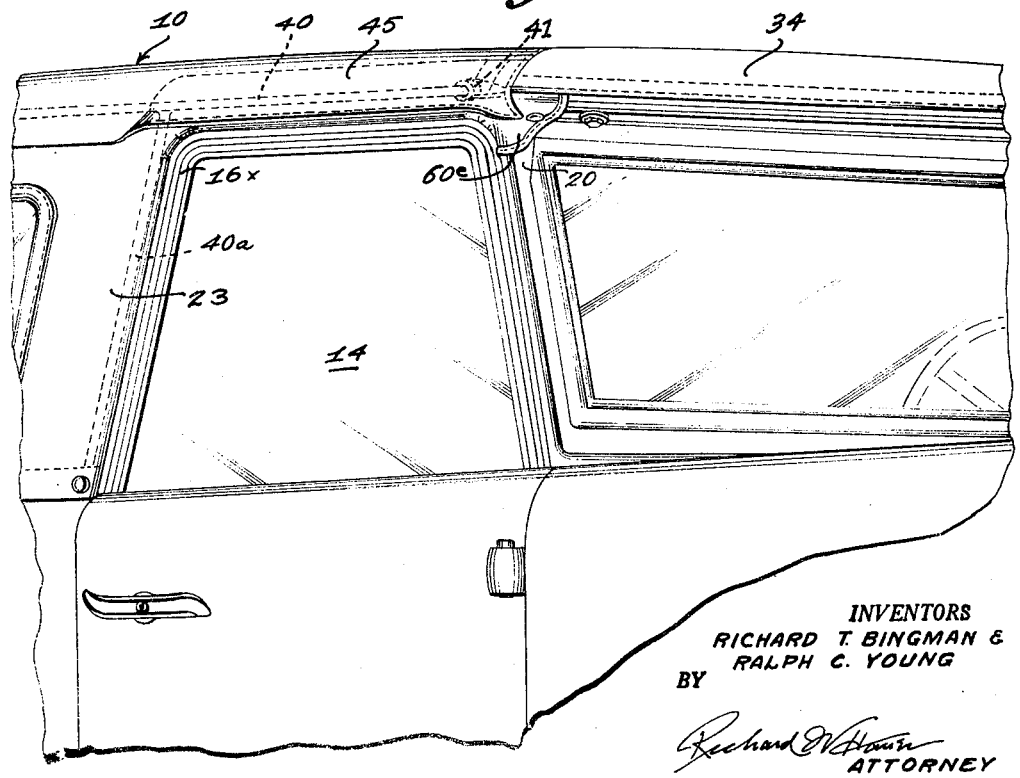
FIGURE 2 is an enlarged perspective view of that portion of the vehicle and top pertinent to the improvements of the invention, illustrating the unions of the top leading edge and the windshield frame and the side door and top.

As noted particularly in FIGURE 2, the side curtain panel 23 extends forwardly to the door and abuts thereagainst when the door is closed. Above the door and underlying the side flap 45 is a finger-like extension of the side curtain fabric which extension takes the form of a plait of fabric above referred to as a sealing skirt 48. Aside from its attachment to the top along the longitudinal seam 47, the sealing skirt is independent of the top and the side flap 45 and can move laterally relative thereto. Running along the closed bottom edge of the skirt 48 and continuously around the upstanding edge of the side panel 23 is a bead 50 formed by enclosing a flexible cord 52 between the two inner surfaces of the folded fabric along the said edge of the side panel 23 and skirt 48. Beading the edge of the skirt 48 and the side panel 23 gives additional substance and rigidity to the edge, against which the door may close, thus creating an effective and substantially air-tight seal with the door.

The cord 52 is tightly wrapped within the closed edge of the skirt forming plait and the hemmed edge of the side panel 23 by virtue of a stitched seam 54 adjacent the cord and parallel therewith. Above the said seam 54 and between the layers of fabric in the skirt is inserted the metal side supporting rod 40 which acts primarily to stabilize the skirt 48, and to provide a relatively fixed and solid line against which the door can close and a weather seal can be established.

Figure 5:
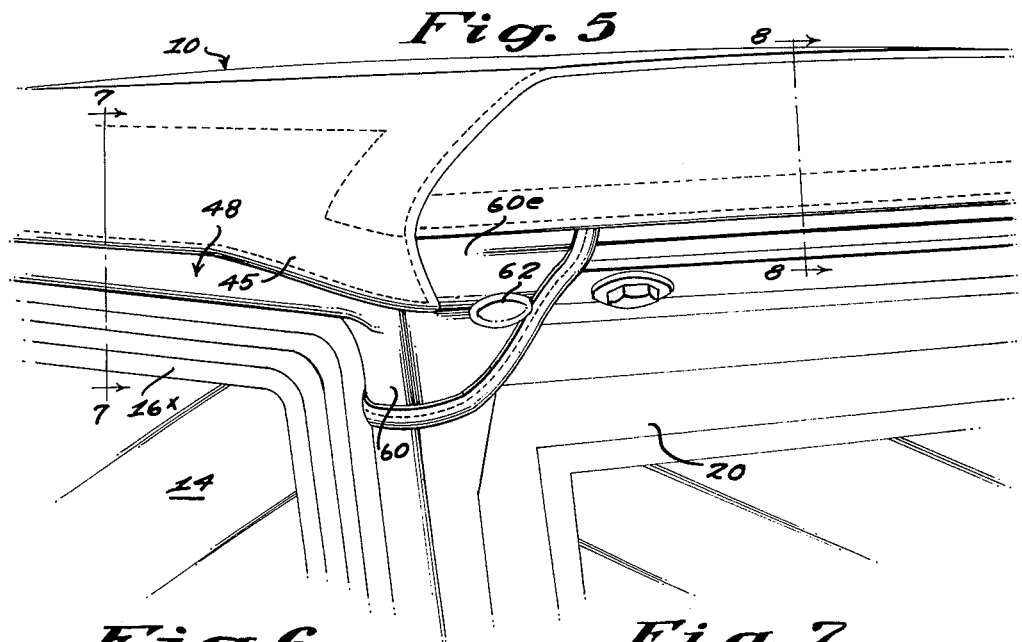
FIGURE 5 is a view similar to that of FIGURE 4 except that the vehicle door is shown closed.
Figure 6:
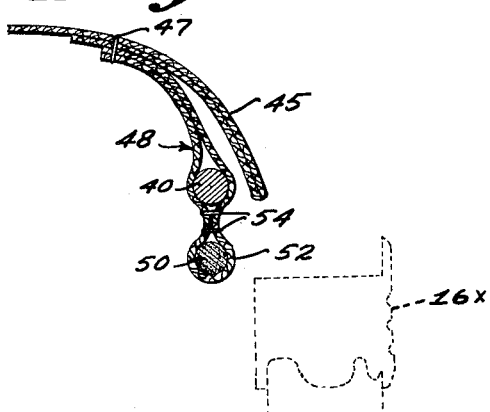
FIGURE 6 is a cross-sectional view of the top and sealing skirt taken along lines 6—6 in FIGURE 4. A cross-sectional view of the top of the vehicle door frame is shown in broken lines.
Figure 7:
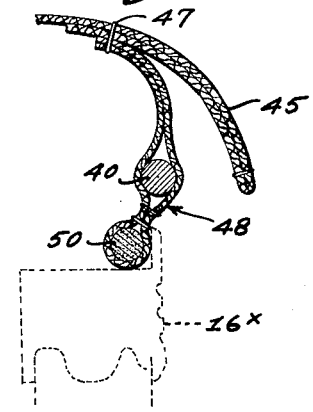
FIGURE 7 is a cross-sectional view similar to that of FIGURE 6 except it is taken along lines 7—7 of FIGURE 5. The door frame is outlined in broken lines.

The support rod 40 serves another highly important function which is illustrated graphically in FIGURES 6 and 7, with regard to the proper shaping of the moisture deflector side flaps 45. It should be noted that when the door of the vehicle is open (FIGURE 5) the flap 45 overlays the skirt 48 and is relatively close thereto. However, when the door is closed (FIGURE 7) the beaded edge 50 of the skirt 48 is forced inwardly, pivoting the plait of fabric about the longitudinal axis formed by the supporting rod 40. The relative movement with respect to the rod 40, of the two layers of material on either side thereof causes the material of the plait to bulge outwardly in the vicinity of its upper portion and divaricate the skirt 48 and the rain flap 45. As seen particularly in FIGURES 5 and 7, the flap protrudes over the door window frame, thus creating a deflection awning over the doorway which further assures the perfection of the door seal.

As a final measure against the leakage of air through the joint formed by the closure of the convertible top, a corner-forming tab 60 is advantageously formed by the further forward extension of the sealing skirt outer fabric. The shape of the tab is depicted in FIGURES 3 and 4, wherein the outline of the hidden or covered portion of the tab may be recognized by the lineal seam 47 which secures the skirt 48 to the top 10, and by that same seam's Z-shaped forward terminal portion. A front ear 60e of the tab 60 is bent inwardly 90° around the outside forward corner of the windshield frame as shown in FIGURE 4 and is sewed along its top edge to the depending front flap 34. A snap fastener 62 is provided to snugly seat the front ear 60e to the contour of the abutting structure, thus eliminating gaps or large cracks through which air might enter the vehicle.

The tab 60 and its front ear 60e serve two highly important functions in a top structure such as the one herein described. Primarily, the purpose of the tab 60 is to establish a flexible anchoring terminal for the forward end of the sealing skirt 48 and its lower beaded edge 50 while at the same time permitting lateral pivotal movement of the skirt 48 about the side supporting rod 40, which movement is largely responsible for the protrusion of the side flap 45 into a moisture shield, as described above. The fact that the tab 60 is brought out from the interior of the vehicle between the door and the windshield frame and formed around the corner of the windshield frame is illustrative of the second function of the tab 60 and its ear 60e, which is the prevention of air leakage which would exist were the tab merely fastened to the outside edge of the windshield frame.

To achieve these objectives the beaded edge 50 is made to end at a point just inside the forward edge of the door frame 16x when the door is closed. Bias binding then covers the extreme end of the beaded edge 50 and continues along the bottom edge of the tab 60 and the projecting ear 60e.

As seen in FIGURE 5, the beaded skirt edge lies in continuously close contact with the door frame when the door is closed, the anchoring tab 60 being responsible for maintaining the beaded edge 50 taut against the closed door and thereby obviating holes and open cracks at the corner of the door.

Having thus described and illustrated the several useful and novel features of the convertible top construction of the present invention, it will be seen that the many and worthwhile objectives for which it was designed have been achieved. We realize that certain additional modifications may well occur to those skilled in the art within the broad teaching hereof; hence it is our intention that the scope of protection afforded hereby shall be limited only insofar as the limitations are expressly set forth in the appended claims.

We claim:

1. In combination with a vehicle front windshield frame;
    a fabric vehicle top having a front depending flap;
    channel forming means horizontally disposed along the top edge portion of the said windshield frame, said channel forming means being substantially rectangular in its transverse cross section and having a downwardly exposed opening;
    a flat retainer strip;
    means forming a welt inwrapping said retainer strip and sized to fit snugly within the channel forming means, the welt forming means being a leading edge of the said depending flap and of a thickness less than the width of the exposed opening of the channel forming means;
    and means exerting a rearward force on the fabric top, whereby the inwrapped holding strip is held fast within the channel forming means.

2. In a vehicle of the type having side doors, wherein the interior of the body thereof is enclosed by a fabric top which attaches at its forward edge to the top horizontal portion of an upstanding windshield frame and wherein the vehicle side door abuts, when closed, against the fabric top and seals along its forward edge against the side portion of the windshield frame, the combination with said door and windshield frame comprising;
    a fabric top adapted to cover the interior of the vehicle body including means for detachably fastening the front thereof to the upper portion of the windshield frame, said means comprising,
        a downwardly depending front flap member;
    a pair of downwardly depending flaps respectively arranged along the sides of the top and integral therewith and above the said doors;
    a pair of rigid horizontal support rods attached to the vehicle and respectively located above the said doors;
    and a sealing skirt affixed to the underside of each of the depending side flaps, said sealing skirt comprising,
        a plait of fabric doubled back upon itself forming an elongated fabric stirrup embracing one of the support rods, the free longitudinal edges of the stirrup being sewn to the said depending side flap; and
    bead forming means carried in the fold of the fabric stirrup.

3. In a vehicle of the type having side doors, wherein the interior of the body thereof is enclosed by a fabric top which attaches at its forward edge to the top horizontal portion of an upstanding windshield frame and wherein the vehicle side door abuts when closed against the fabric top and seals along its forward edge against the side portion of the windshield frame, the combination with said door and windshield frame comprising;
    a fabric top adapted to cover the interior of the vehicle body including means for detachably fastening the front thereof to the upper portion of the windshield frame, said means comprising,
        a downwardly depending front flap member;
    a pair of downwardly depending flaps respectively arranged along the sides of the top and integral therewith and above the said doors;
    a pair of rigid horizontal support rods attached to the vehicle and respectively located above the said doors;
    and a sealing skirt affixed to the underside of each of the depending side flaps, said sealing skirt comprising,
        a plait of fabric doubled back upon itself and hemmed around and enveloping the support rod, and bead forming means bordering the said skirt and integral therewith;

a corner forming pendant tab integral with said sealing skirt and having a forwardly projecting ear whose upper portion is affixed to the underside of the said downwardly depending front flap;

and fastener means attached to the said ear and the top portion of the windshield frame adjacent the corner thereof and adapted to securely seat the said tab and projecting ear in a flush surface-to-surface engagement with the corner portion of the said windshield frame.

4. In a vehicle of the type having side doors, wherein the interior of the body thereof is enclosed by a fabric top which attaches at its forward edge to the top horizontal portion of an upstanding windshield frame and wherein the vehicle side door abutts when closed against the fabric top and seals along its forward edge against the side portion of the windshield frame, the combination with said door and windshield frame comprising;

a fabric top adapted to cover the interior of the vehicle body including means for detachably fastening the front thereof to the upper portion of the windshield frame, said means comprising, a downwardly depending front flap member;

a pair of downwardly depending flaps respectively arranged along the sides of the top and integral therewith and above the said doors;

a pair of rigid horizontal support rods attached to the vehicle and respectively located above the said doors;

and a sealing skirt affixed to the underside of each of the depending side flaps, said sealing skirt comprising, a plait of fabric doubled back upon itself and hemmed around and enveloping the support rod, and bead forming means bordering the said skirt and integral therewith;

and wherein said bend forming means comprises a flexible cord enclosed in the outer marginal extremity of the hemmed sealing skirt.

5. The combination of claim 4, and further including channel forming means disposed along an upper vertical face of the said windshield frame, said channel having a downwardly exposed opening, welt forming means attached to the underside of the front flap, said welt forming means comprising an elongated pliant tube and a retainer member inserted within the tube, the welt forming means adapted to be inlaid into the channel, providing a detachable lineal anchorage for the forward edge of the fabric top.

6. The vehicle top of claim 5 wherein the downwardly depending side flaps overlay the ends of the welt tube and the retainer member.

7. In a vehicle having a load carrying interior and a pair of side doors, the combination comprising;

upstanding windshield framing means attached to the vehicle forward of the interior thereof;

a pliant top forming member covering the said interior and having a flap along the front edge of the top and depending over the upper edge of the said windshield framing means;

a downwardly opening horizontally disposed channel attached to the upper portion of the frontal surface of the windshield framing means;

and a retainer strip carried by said depending front edge flap and disposed within said channel;

a pair of side flaps integral with the top and located over the side doors of the vehicle;

side curtain means depending from the top posteriorly of the side doors;

skirt forming means integral with the side curtain means and extending forwardly therefrom and underlying said side flaps and attached thereto; and a continuous bead formed along the forward margin of the side curtain means and the lower margin of the skirt forming means.

8. The structure of claim 7 wherein the skirt forming means comprises a plait of pliant material doubled back upon itself;

and further including a horizontally disposed rigid side supporting member attached at each of its ends to the vehicle, said supporting member being disposed between the folds of material in the skirt forming plait.

9. In a vehicle having a load carrying interior and a pair of side doors, the combination comprising;

upstanding windshield framing means attached to the vehicle forward of the interior thereof;

a pliant top forming member covering the said interior and having a flap along the front edge of the top and depending over the upper edge of the said windshield framing means;

a downwardly opening horizontally disposed channel attached to the upper portion of the frontal surface of the windshield framing means;

and a retainer strip carried by said depending front edge flap and disposed within said channel;

a pair of side flaps integral with the top and located over the side doors of the vehicle;

side curtain means depending from the top posteriorly of the side doors;

skirt forming means integral with the side curtain means and extending forwardly therefrom and underlying said side flaps and attached thereto;

a continuous bead formed along the forward margin of the side curtain means and the lower margin of the skirt forming means, wherein the skirt forming means comprises a plait of pliant material doubled back upon itself;

and further including a horizontally disposed rigid side supporting member attached at each of its ends to the vehicle, said supporting member being disposed between the folds of material in the skirt forming plait; and a forwardliy projecting tab integral with the skirt forming means and sized to wrap around the outside corner of the windshield framing means.

References Cited by the Examiner

UNITED STATES PATENTS

| | | | |
|---|---|---|---|
| 2,423,748 | 7/47 | Acheson | 296—102 |
| 2,430,442 | 11/47 | Acheson | 296—102 |
| 2,463,646 | 3/49 | Schassberger | 296—102 |
| 2,620,224 | 12/52 | Hedley | 296—44 |
| 2,682,427 | 6/54 | Bright | 296—44 |
| 2,785,003 | 3/57 | Zaravsey | 296—107 |
| 2,817,558 | 12/57 | Kubacka | 296—44 |
| 3,122,394 | 2/64 | Brydon | 296—120 |

FOREIGN PATENTS

| | | |
|---|---|---|
| 525,202 | 5/56 | Canada. |
| 835,845 | 4/52 | Germany. |

A. HARRY LEVY, *Primary Examiner.*

PHILIP ARNOLD, *Examiner.*